Dec. 15, 1964  B. H. PINCKAERS  3,161,774
PULSE CONVERTER CONTROL APPARATUS
Filed Jan. 30, 1961
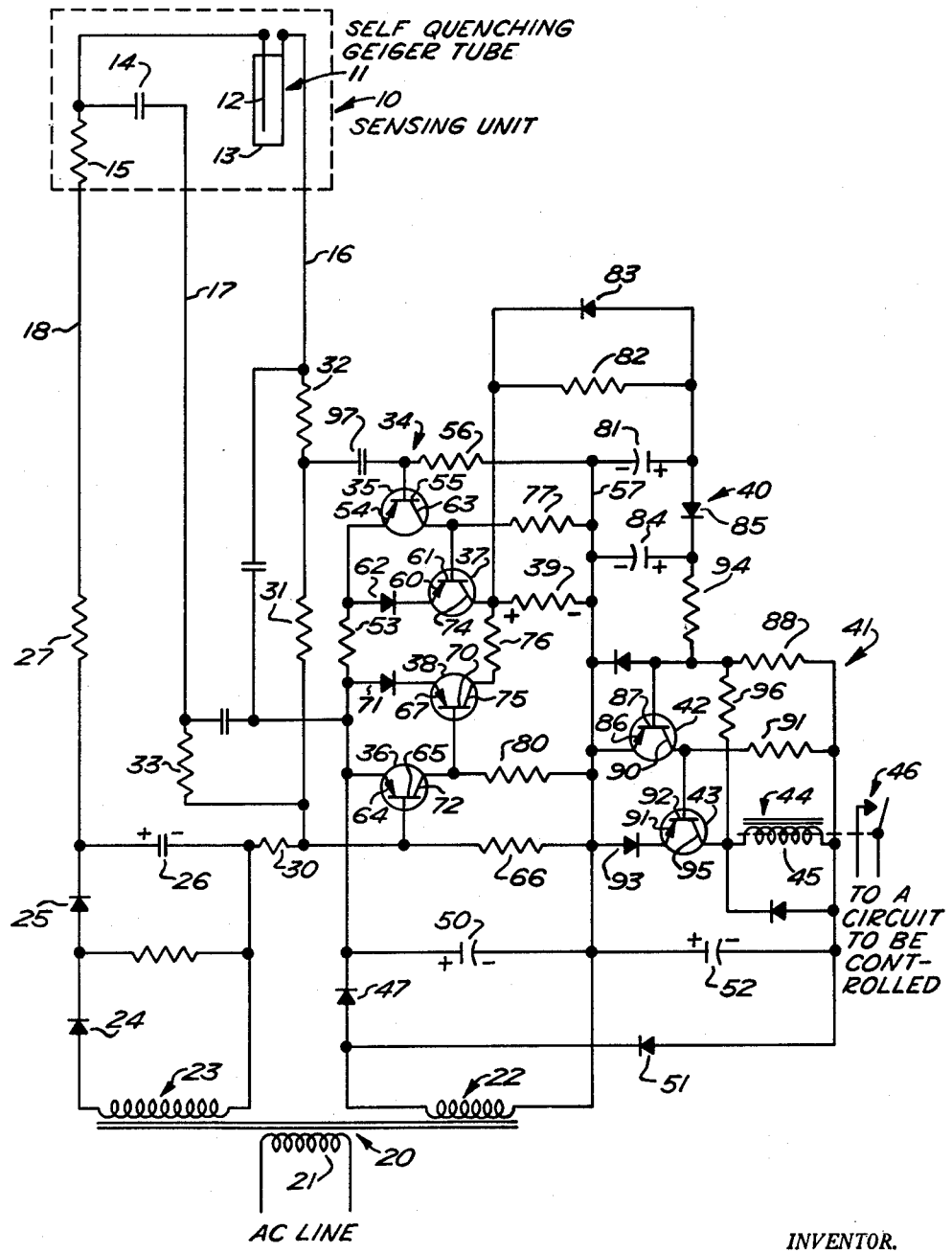
INVENTOR.
BALTHASAR H. PINCKAERS
BY
ATTORNEY

United States Patent Office 3,161,774
Patented Dec. 15, 1964

3,161,774
PULSE CONVERTER CONTROL APPARATUS
Balthasar H. Pinckaers, Edina, Minn., assignor to
Honeywell Inc., a corporation of Delaware
Filed Jan. 30, 1961, Ser. No. 85,626
7 Claims. (Cl. 250—83.6)

The present invention is concerned with an improved control apparatus and particularly with a control apparatus utilizing a condition sensor of the Geiger tube type, this type of condition sensor being of the more general type which inherently provides short time duration signal pulses. As is well known, when a Geiger tube is subjected to a condition to which it is sensitive, these signal pulses occur at a somewhat irregular time interval and are relatively closely spaced. That is, during a given time interval a substantial total number of individual signal pulses are provided by the Geiger tube. The Geiger tube also has an inherent characteristic which is known as the background count. As a result of this background count, the Geiger tube, even when not subjected to a condition to which it is sensitive, periodically, and at a random and somewhat unpredictable rate, provides similar signal pulses. However, within the same given time interval, a much lower total number of signal pulses will be provided by the Geiger tube when the Geiger tube is not subjected to a condition to which it is sensitive.

Prior art devices provide various pulse sensing networks which, in one way or another, count the number of signal pulses which occur within a given time interval. So long as the number of signal pulses within the given time interval are greater than a pre-selected minimum number, then an output is provided indicating that the Geiger tube is subjected to the condition to which it is sensitive. These prior art devices are not, however, sensitive to the time spacing between any two signal pulses. The only requirement in the prior art is that during a given time interval there be at least a minimum number of signal pulses.

The present invention provides a control apparatus including a pulse converter to provide a constant output signal in response to input signal pulses provided only that no two signal pulses be spaced in time by an interval which is greater than a selected time interval. The apparatus of the present invention does not provide an output signal when this time interval between any two signal pulses is exceeded, and this is true independent of the past history of the signal pulses. That is, the output of the apparatus of the present invention is independent of the regularity with which the signal pulses may have been appearing during the immediately preceding time interval.

In this manner, the apparatus of the present invention provides very sensitive and accurate discrimination against the inherent background count of the Geiger tube. Even though the background count may be high in a particular condition and so high that within a given time interval a large total number of signal pulses are provided in the absence of the condition to which the Geiger tube is sensitive, the apparatus of the present invention provides the maximum in discrimination against such a high background count rate due to the requirement of the present invention that no two signal pulses be separated by greater than a given time interval.

The specific arrangement of the present invention will be apparent to those skilled in the art upon reference to the following specification, claims, and drawing, of which the single figure is a schematic representation of an embodiment of my invention.

Referring now to the single figure, reference numeral 10 designates generally a condition sensing unit which includes a Geiger tube 11 having an anode 12 and a cathode 13, located within a housing designated by the enclosing broken line, the housing also including a capacitor 14 and a resistor 15. The sensing unit 10 is connected to the remaining portion of the control apparatus by lead wires 16, 17 and 18.

The supply voltage for Geiger tube is derived from a transformer 20 having a primary winding 21 connected to a source of alternating voltage, not shown. Transformer 20 is provided with a relatively low voltage secondary winding 22 and a relatively high voltage secondary winding 23. Secondary winding 23 is connected through rectifiers 24 and 25 to a capacitor 26 which is charged to the polarity indicated, this capacitor forming the source of supply voltage for Geiger tube 11. The positive terminal of capacitor 26 is connected through a resistor 27 and resistor 15 to the anode 13 of the Geiger tube, while the negative terminal of capacitor 26 is connected through resistors 30, 31 and 32 to the cathode 13 of the Geiger tube.

The signal output of means including Geiger tube 11 is derived across resistor 31 and is applied to input means of a pulse converter, designated generally by means of the reference numeral 34.

Pulse converter 34 is provided with a first and a second input, the first input including a first transistor 35 and the second input including a second transistor 36. Transistors 35 and 36 are respectively connected in controlling relation to third and fourth transistors 37 and 38, transistors 37 and 38 in association with a common load impedance 39 constituting the output means of the pulse converter 34.

The output means of the pulse converter is connected to an integrating circuit designated generally by means of the reference numeral 40. Integrating circuit 40 is effective to integrate the signal voltage present across resistor 39 and to apply an integrated voltage to the input of a monostable switching network designated generally by means of reference numeral 41, the switching network 41 having a transistor 42 and a transistor 43, with transistor 42 connected in controlling relation to transistor 43, and with transistor 43 connected to control the energization of output means in the form of a relay 44 having a winding 45 and a normally open switch 46. As shown in the single figure, switch 46 is indicated as being connected to a circuit to be controlled. In actual practice, relay 44 may be provided with a number of switches which may be connected to circuits to perform a variety of control functions. However, for simplification, relay 44 is shown with a single switch connected to a circuit, not shown.

Operating voltage for pulse converter 34 is provided from transformer secondary winding 22 which is connected to a diode 47 to charge a capacitor 50 to the polarity indicated. The operating voltage for switching means 41 is also provided from secondary winding 22 which is connected to a further diode 51 to charge a further capacitor 52 to the polarity indicated.

Referring now specifically to pulse converting means 34, the first transistor 35 of this means is biased to a conducting state by means of a forward biasing circuit which can be traced from the positive terminal of capacitor 50 through resistor 53, emitter 54 and base 55 of transistor 35, resistor 56 and conductor 57 to the negative terminal of capacitor 50. The input electrodes of transistor 37, that is, emitter 60 and base 61 are connected through a diode 62 to the output electrodes (emitter 54 and collector 63) of the conductive transistor 35. Thus, since transistor 35 is conductive, transistor 37 is maintained nonconductive.

The second transistor 36 of the pulse converter is also biased to be conductive by means of a circuit which can be traced from the positive terminal of capacitor 50 through the emitter 64 and base 65 of transistor 36, and resistor 66 to the negative terminal of this capacitor. The input electrodes of transistor 38, that is, emitter 67 and base 70, are connected through a diode 71 to the output electrodes (emitter 64 and collector 72) of the conductive transistor 36. Thus, since transistor 36 is conductive, transistor 37 is maintained nonconductive.

This, then, is the quiescent or normal condition of operation of the pulse converter 34 wherein transistors 35 and 36 are conductive and transistors 37 and 38 are nonconductive. The output electrodes of transistors 37 and 38 are connected to a common load impedance in the form of a resistor 39, the transistor 37 having its collector electrode 74 connected directly to resistor 38 while the emitter electrode 75 of transistor 38 is connected through a resistor 76 to resistor 39.

The further resistors 77 and 80 are provided for the pulse converter to furnish a forward biasing circuit to turn on transistors 37 and 38, as will be described. The output signal from pulse converter 34 is developed across resistor 39. The signal thus developed is a D.C. voltage having the polarity indicated, that is, with the left-hand terminal positive. This output signal voltage is applied to the input of integrating means 40, and specifically this voltage is effective to charge a capacitor 81 through a resistor 82, resistor 82 being shunted by a diode 83. As can be seen, diode 83 is connected in a reverse direction so far as charging of capacitor 81 is concerned. However, diode 83 is effective to substantially immediately discharge capacitor 81 through resistor 39 as soon as the output signal voltage across resistor 39 no longer exists, for example, due to any two pulses of signal voltage derived from Geiger tube 11 being spaced by greater than the above-mentioned maximum time interval. In a particular embodiment of the present invention, resistor 82 consisted of 36,000 ohms while resistor 39 consisted of 1800 ohms. Thus it can be seen that the charging time for capacitor 81 is substantially longer than the discharge time for this capacitor due to the fact that for a discharge, relatively high impedance resistor 82 is shunted by diode 83.

The charge on capacitor 81 is distributed to a further capacitor 84 by means of a diode 85. Diode 85 allows capacitor 84 to charge, but prevents the immediate discharge of this capacitor in the event that capacitor 81 should become discharged as above-described.

The output of the integrating means 40, that is, the voltage present on capacitor 84, is applied to the input of the monostable switching means 41. The stable condition for monostable switching means 41 is established by means of a forward biasing circuit for transistor 42. This circuit can be traced from the positive terminal of capacitor 52 through the emitter 86 and the base 87 of transistor 42, and resistor 88, to the negative terminal of this capacitor. The output electrodes, that is, emitter 86 and collector 90, of transistor 42 are connected through a further resistor 91 to capacitor 52. Thus, since transistor 42 is conductive, transistor 43 is maintained nonconductive, its input electrodes, emitter 91 and base 92, being connected through a diode 93 to the output electrodes of the conductive transistor 42.

The presence of an output voltage from integrating means 40 is effective to apply a positive voltage to the base 87 of the normally conductive transistor 42, this voltage being applied thereto through a resistor 94. This voltage is effective to render transistor 42 nonconductive, thus allowing transistor 43 to become conductive by means of a forward biasing circuit which can be traced from the positive terminal of capacitor 52 through diode 93, emitter 91 and base 92 of transistor 43, and resistor 91 to the negative terminal of this capacitor. Transistor 43 thus becomes conductive and current flows from the emitter 91 to the collector 95. A feedback circuit including a resistor 96 is connected to collector 95 and is effective to apply a voltage to the base electrode 87 of transistor 42 of a polarity tending to maintain this transistor in a cutoff condition.

As transistor 43 is rendered conductive, a current flows from its emitter to its collector and through the winding 45 of relay 44 to thus energize this relay winding and close switch 46, this being done in response to an output voltage from integrating means 40, this voltage in turn being indicative of the presence of the condition to which the Geiger tube 11 is sensitive.

Thus far, the description has dealt with the detailed operation of the individual circuit components as shown in the drawing. Consider now a single ionizing event which causes a single output current pulse of very short duration, sometimes lasting only 5 micro-seconds, from Geiger tube 11. Capacitor 14, resistor 15 and the Geiger tube operate together in what is known as a relaxation oscillator. The Geiger tube is the discharge element which, when an ionizing event occurs, will discharge capacitor 14 to a value of voltage at which conduction ceases (extinction voltage). This only happens if at the instant that the ionizing event occurs the voltage across capacitor 14 has a sufficiently high value (firing voltage). Hence it can be seen that only if sufficiently high voltage exists across capacitor 14 and in addition an ionizing event occurs a very short duration pulse current occurs through the Geiger tube. The path followed by this pulse current is from left hand terminal of capacitor 14, Geiger tube 11, conductor 16, resistors 32, 31 and 33, and conductor 17 to the right hand terminal plate of capacitor 14. Thus a voltage pulse occurs across resistor 31, such that the upper terminal of 31 is positive with respect to the lower terminal thereof.

No further pulse from or thru the Geiger tube can occur until capacitor 14 has been recharged to a sufficiently high voltage. The charging circuit for capacitor 14 can be traced from positive terminal of capacitor 26, through resistors 27 and 15, capacitor 14, conductor 17 and resistors 33 and 30 to negative terminal of capacitor 26.

The voltage pulse existing across resistor 31 is applied to the input means of the pulse converter 34 and a circuit can be traced from the upper positive terminal of resistor 31 through a capacitor 97, the base to emitter circuit of transistor 35, resistor 53, the emitter to base circuit of transistor 36, to the negative terminal of resistor 31. From this circuit it can be seen that this current flow, which is in the form of a pulse, is in a direction to constitute a reverse biasing current for transistor 35 and a forward biasing current for transistor 36. Since transistor 36 is already conductive, as above described, there is no effect on the state of operation of transistor 36. However, transistor 35, normally in a conducting state, is biased to be momentarily nonconductive by means of this pulse current.

Transistor 37 is now rendered conductive by means of a forward biasing circuit which can be traced from the positive terminal of capacitor 50 through resistor 53, diode 62, the emitter to base circuit of transistor 37, and resistor 77 to the negative terminal of capacitor 50. Also, an output current flow circuit can be traced for transistor 37 from the positive terminal of capacitor 50 through resistor 53, diode 62, the emitter to collector circuit of transistor 37, and output load resistor 39 to the negative terminal of capacitor 50.

The output current just traced causes a substantial increase in voltage drop across resistor 53 such that the lower terminal is positive. This voltage adds (series addition) to the pulse voltage momentarily existing across resistor 31, so that when the pulse voltage disappears the voltage across resistor 53 is effective in keeping transistor 35 biased to be non-conductive. This state persists until capacitor 97 has been charged to a voltage substantially equal to that existing across resistor 53. The charging circuit for capacitor 97 can be traced from the positive terminal of capacitor 50, emitter to base circuit of transistor 36, resistor 31, capacitor 97, resistor 56 to the negative terminal of capacitor 50. Thus the left hand terminal of capacitor 97 will be charged positive. When the voltage across 97 approximately equals the voltage across resistor 53 (which is the result of output current through resistor 39), transistor 35 will become again forward biased (emitter positive with respect to base) and starts to become also conductive from emitter to collector. Therefore, since this causes transistor 37 to become less conductive there is a decrease in the voltage across resistor 53. This in turn causes transistor 35 to become still more conductive and so regeneratively transistor 35 becomes completely conductive, and transistor 36 completely non-conductive. It can be seen that, since at this instant the voltage across resistor 53 suddenly decreases to a much lower value, the voltage across capacitor 97 is now much higher than that across resistor 53. Therefore, capacitor 97 discharges. The capacitor is essentially discharged by the (low value) bias current existing in resistor 66. The discharge current path may be traced from the (positive) left hand terminal of capacitor 97, through resistor 31, resistor 66, capacitor 50, resistor 53, emitter to base circuit of transistor 35, to the negative terminal of capacitor 97. During the existence of this current the base-emitter circuit of transistor 36 is reverse biased by a voltage equal to the voltage existing across capacitor 97 minus the voltage drop caused by the discharge current in resistor 31 and minus the now low voltage drop existing across resistor 54. Therefore transistor 36 is rendered non-conductive and transistor 38 conductive, and because resistor 76 is equal to resistor 53 equal load voltage exists across resistor 39. However, the nonconduction of transistor 36 now allows transistor 38 to become conductive as a result of a forward biasing circuit which can be traced from the positive terminal of capacitor 50 through diode 71, the emitter to base circuit of transistor 38, and resistor 80 to the negative terminal of this capacitor. Transistor 38 now conducts between its output electrodes and a circuit can be traced from the positive terminal of capacitor 50 through diode 71, the emitter and collector circuit of transistor 38, resistor 76, and output load resistor 39 to the negative terminal of capacitor 50. In this manner, the output voltage previously present across resistor 39, due to the conduction of transistor 37, is maintained during the discharge of capacitor 97 due to this conduction of transistor 38. This state persists until the voltage across capacitor 97 has been decreased to a value at which transistor 36 is no longer reverse-biased and goes into conduction again. At that time the circuit goes back to the state that existed prior to the occurrence of the single Geiger tube current pulse.

The action of the pulse converter 34 is now clear. As shown, a single isolated signal pulse derived from the Geiger tube renders transistor 37 conductive for some period of time immediately followed by a period of time (not necessarily equal) during which transistor 38 is conductive. Also, it may be observed that when another signal pulse occurs during the period when transistor 37 is conductive no change of state occurs, however, if such another signal pulse occurs during the period when transistor 38 is conductive a reversal of state occurs whereby transistor 38 is rendered non-conductive and transistor 37 conductive. Every time that transistor 37 is rendered conductive it will remain conductive, no matter how many other signal pulses occur in the meantime, until capacitor 97 has been substantially charged to the voltage then (when transistor 37 is conductive) existing across resistor 53. It is clear now that, when receiving a train or stream of pulses, continuous and uninterrupted voltage will exist across resistor 39 so long as an input pulse occurs at or before the end of the discharge period of capacitor 97 or the period during which transistor 38 is conductive. Since in such a random pulse train, in which the time period between successive pulse is constantly changing, a pulse could just occur at the end of charging period of capacitor 97 (where it has no effect) it follows that to guarantee uninterrupted voltage across resistor 39 any two pulses in such a random pulse train cannot be separated (in time) by a time interval greater than the discharge time of capacitor 97, during which transistor 38 is conductive.

Thus, it can be seen that pulse converting means 34 can be considered to have a first and second input means constituted by transistors 35 and 36 respectively. The first input means is sensitive to and is controlled by the charging current for capacitor 97, while the second input means is sensitive to and controlled by the discharging current for this capacitor. Furthermore, transistors 37 and 38 in conjunction with the common output load means 39 can be considered to constitute a single output means jointly controlled by the two input means and effective to maintain a continuous output voltage so long as one or the other of the two input means is rendered nonconductive in the manner above described.

Thus far, only a single signal pulse, followed by a short time interval of no signal, has been considered. If this single signal pulse constitutes a random and infrequent background count, then capacitor 97 substantially discharges before a further signal pulse is received and a continuous voltage is not provided across resistor 39, thus preventing integrating means 40 from developing an output signal. However, in the event that this single signal pulse is the first of a continuous series of pulses indicative of the presence of a condition to which Geiger tube 11 is sensitive, then before capacitor 97 completely discharges, a further signal pulse is developed across resistor 31, and capacitor 97 recharges in the manner above described. Here, again, this second signal pulse is followed by a further period of discharging for capacitor 97.

With a continuous output voltage across resistor 39, capacitor 84 of integrating means 40 charges and the monostable switching means 41 is actuated to energize relay 44 as above described.

Thus, it can be seen that I have provided an improved control apparatus which provides a fine degree of discrimination against the background count of the Geiger tube 11 by providing a constant output across resistor 39 only in response to signal pulses occurring at intervals less than a given time interval. Thus, regardless of the past history of the frequency of the signal pulses, my apparatus immediately detects the presence of any two pulses which are spaced by greater than the given time interval and the steady state voltage across resistor 39 is broken as a result thereof.

Other modifications of the present invention will be apparent to those skilled in the art, and it is therefore intended that the scope of the present invention be limited solely by the scope of the appended claims.

I claim as my invention:

1. Control apparatus comprising; a condition sensing means of the type providing a continuous series of randomly spaced short time duration signal pulses upon being subjected to a given condition; pulse converting means having a first and a second independent input means, each of which is connected to control a common output means, a capacitor, circuit means interconnecting said first and second input means, said capacitor and said condition sensing means such that a first signal pulse of said series of signal pulses is effective to modify the state of charge of said capacitor and to control said first input means to cause an output signal to appear at said output means, said capacitor being effective during the time period between said first signal pulse and a succeeding signal pulse to control said second input means and maintain said output signal at said output means, a continuous output signal thereby being maintained at said output means so long as he individual signal pulses are not spaced greater than a given time interval; and control means connected to be controlled by said output means.

2. Control apparatus comprising; condition sensing means of the type providing a continuous series of randomly spaced signal pulses of short time duration upon being subjected to a given condition; first and second controllable current conducting devices each having input means and an output, a capacitor, means serially connecting the input means of said first and second current conducting devices in series with said capacitor to said condition sensing means to thereby charge said capacitor through said input means upon the occurrence of each individual signal pulse, said charging current being effective to render said first of said current conducting devices conductive and to render said second of said current conducting devices non-conductive, said capacitor being effective to discharge during the time period between succeeding signal pulses, said discharge current being effective to render said first current conducting device nonconductive and to render said second current conducting device conductive, output means jointly controlled by the output of said first and second current conducting devices to provide an output signal at all times during which one of said current conducting devices is nonconductive, to thereby provide a continuous output signal so long as the signal pulses provided by said condition sensing means are time spaced by no more than a given maximum time interval; and control means connected to be controlled by said output means.

3. Control apparatus comprising; condition sensing means adapted to be subjected to a given condition and to provide a continuous series of randomly spaced signal pulses of short time duration upon being subjected to the given condition; a first and a second transistor each having input means and output means, a capacitor, circuit means connecting said capacitor in series with the input means of said first and second transistors, means connecting said series circuit to said condition sensing means such that the presence of a signal pulse is effective to charge said capacitor and provide a charging current as a reverse biasing current for a first of said transistors and a forward biasing current for a second of said transistors, said capacitor being effective to discharge during the time period between said signal pulses and said discharge current providing a forward biasing current for said first transistor and a reverse biasing current for said second transistor, further transistor means jointly controlled by the output means of said first and second transistors and effective to maintain a continuous output signal so long as one or the other of said first and second transistors is provided with a reverse biasing current, to thereby convert said series of spaced signal pulses to a steady state signal provided the time interval between succeeding signal pulses does not exceed a given maximum value as determined by said capacitor; and further means connected to be controlled by said further transistor means.

4. Control apparatus comprising; Geiger tube condition sensing means sensitive to a given condition and providing a continuous series of short time duration signal pulses upon being subjected to the given condition, said Geiger tube having an inherent background count in the absence of the given condition to provide infrequent signal pulses; a first and a second transistor each having input electrodes and output electrodes, a capacitor, circuit means connecting said capacitor in series with the input electrodes of said first and second transistors, the input electrodes of said first and second transistors being connected in a reverse relation such that a charging current for said capacitor is effective to render one of said transistors nonconductive and a discharging current for said capacitor is effective to render the other of said transistors nonconductive, further transistor means connected to be controlled jointly by the output electrodes of said first and second transistors to provide a continuous output signal so long as one or the other of said first and second transistors is in a non-conducting state; circuit means connecting said capacitor to said Geiger tube to provide a charging current therefor for each of said signal pulses, said capacitor discharging during the time interval between said signal pulses; and further means connected to be controlled by said further transistor means, said further means being continuously controlled only in the event that the signal pulses provided by said Geiger tube are spaced by no more than a given time interval as determined by said capacitor to thereby discriminate against the inherent background count of said Geiger tube.

5. Control apparatus comprising; a Geiger tube condition sensor of the type providing a series of short time duration and relatively closely timed spaced signal pulses upon being subjected to a condition to which it is sensitive, and providing inherent background signal pulses of relatively long time spacing in the absence of said condition; a source of direct current voltage, a first and a second transistor each having output electrodes and having input electrodes connected in a forward biasing direction to said source of voltage to thereby maintain said first and second transistors normally conductive, a third and a fourth transistor each having output electrodes and each individually having input electrodes connected to the output electrodes of one of said first and second transistors to thereby maintain said third and fourth transistors normally nonconductive, common output load means connected to the output electrodes of each of said third and fourth transistors; a capacitor, circuit means connecting said capacitor to said condition sensor to alter the state of charge of said capacitor as a result of a signal pulse therefrom, said capacitor tending to return to its initial state of charge during the time period between signal pulses; and means connecting said capacitor in controlling relation to the input electrodes of said first and second transistors to render one of these transistors nonconductive as a result of a signal pulse and to render the other of these transistors nonconductive the time period between the signal pulses, thereby to maintain a continuous output at said output load means only when the pulses derived from said condition sensor are relatively closely time spaced indicative of the presence of said condition.

6. Control apparatus comprising; condition sensing means of the type providing a continuous series of individual spaced signal pulses of short time duration upon being continuously subjected to a given condition; pulse converting means having first and a second input means and a common output means jointly controlled by said input means; means connecting said first and second input means to said condition sensing means to apply said spaced signal pulses thereto upon the presence of said given condition, said first input means being controlled upon the occurrence of a signal pulse to be effective to provide an output signal at said output means for a first interval, electrical energy storage means connected in circuit with said first and second input means to store electrical energy during said first interval and effective upon the subsequent absence of a signal pulse to control said second input means to be effective to provide said output signal at said output means for a second interval; said first and second input means thereby being effective to provide a continuous output signal at said output means in response to said series of spaced signal pulses which are spaced by an interval no greater than the sum of the first and the second interval; and control means connected to said output means.

7. Control apparatus comprising; condition sensing means of the type providing a continuous series of individual spaced signal pulses of short time duration upon being continuously subjected to a given condition; pulse converter means having first and second input means and a common output means jointly controlled by said input means; electrical energy storage means; means connecting said first and second input means and said energy storage means to said condition sensing means to control said first input means upon the occurrence of a signal pulse to provide an output signal at said output means; and means controlled by said first input means in response to a signal pulse and effective to store energy in said energy storage means over a given time interval and to control said first input means to provide an output signal at said output means during said given time interval; said energy storage means being effective at the end of said given time interval to release the energy so stored and to control said second input means to provide an output signal at said output means during a further time interval, the occurrence of a subsequent signal pulse during said further time interval again being effective to control said first input means to provide an output signal at said output means, to thereby provide a continuous signal at said output means in response to a series of spaced signal pulses which are spaced by a time interval no greater than the sum of said given and said further time intervals.

References Cited by the Examiner

UNITED STATES PATENTS

| | | | |
|---|---|---|---|
| 2,699,499 | 1/55 | Jordan | 328—150 |
| 2,780,724 | 2/57 | Fickett | 328—138 |
| 2,833,938 | 5/58 | Pinckaers | 307—88.5 |
| 2,911,545 | 11/59 | Pinckaers | 307—88.5 |
| 2,983,818 | 5/61 | Constable | 250—83.6 |

RALPH G. NILSON, *Primary Examiner.*

ARCHIE R. BORCHELT, JOHN W. HUCKERT,
*Examiners.*